May 23, 1933.   P. SANTURELLO   1,910,933
CONTAINER FOR LIQUIDS
Filed Jan. 24, 1931

INVENTOR.
Peter Santurello.
BY
ATTORNEY.

Patented May 23, 1933

1,910,933

UNITED STATES PATENT OFFICE

PETER SANTURELLO, OF COLUMBUS, OHIO

CONTAINER FOR LIQUIDS

Application filed January 24, 1931. Serial No. 511,049.

My invention relates to a container for liquids and has to do, more particularly, with a container embodying means for dispensing and controlling the discharge of such liquids. It is especially applicable in connection with liquid soap, oil or other liquids commonly dispensed in beauty parlors and similar establishments.

One object of my invention is to provide a dispensing container which may be readily suspended upon a wall or post or other surface comparatively close to the place at which the liquid is to be used. Another object of this invention is to provide a dispensing container which will maintain the liquid in proper condition for use at all times and which will be readily operable and controllable with a minimum of effort.

One of the features of my invention consists in the provision of a container having a flat side but also having a compartment of ample capacity and an ornamental exterior.

Another feature of my invention consists in the provision of a means for heating the liquid in the container, together with a thermostatic control for automatically maintaining the temperature of this liquid at any desired degree.

Still another feature of this invention comprises a dispensing means of flexible form so that the liquid may be discharged at any one of a number of different points and so that it may be measured and automatically controlled to meet varying conditions.

Still another feature of my invention has to do with the provision of a means for agitating the liquid, this means being operable from the exterior of the container.

Other objects and advantageous features of this invention will appear as this description progresses, the preferred embodiment of the invention being shown in the accompanying drawing and detailed description wherein similar figures of reference designate corresponding parts and wherein.

Figures 1, 2, 3, 4, 5:
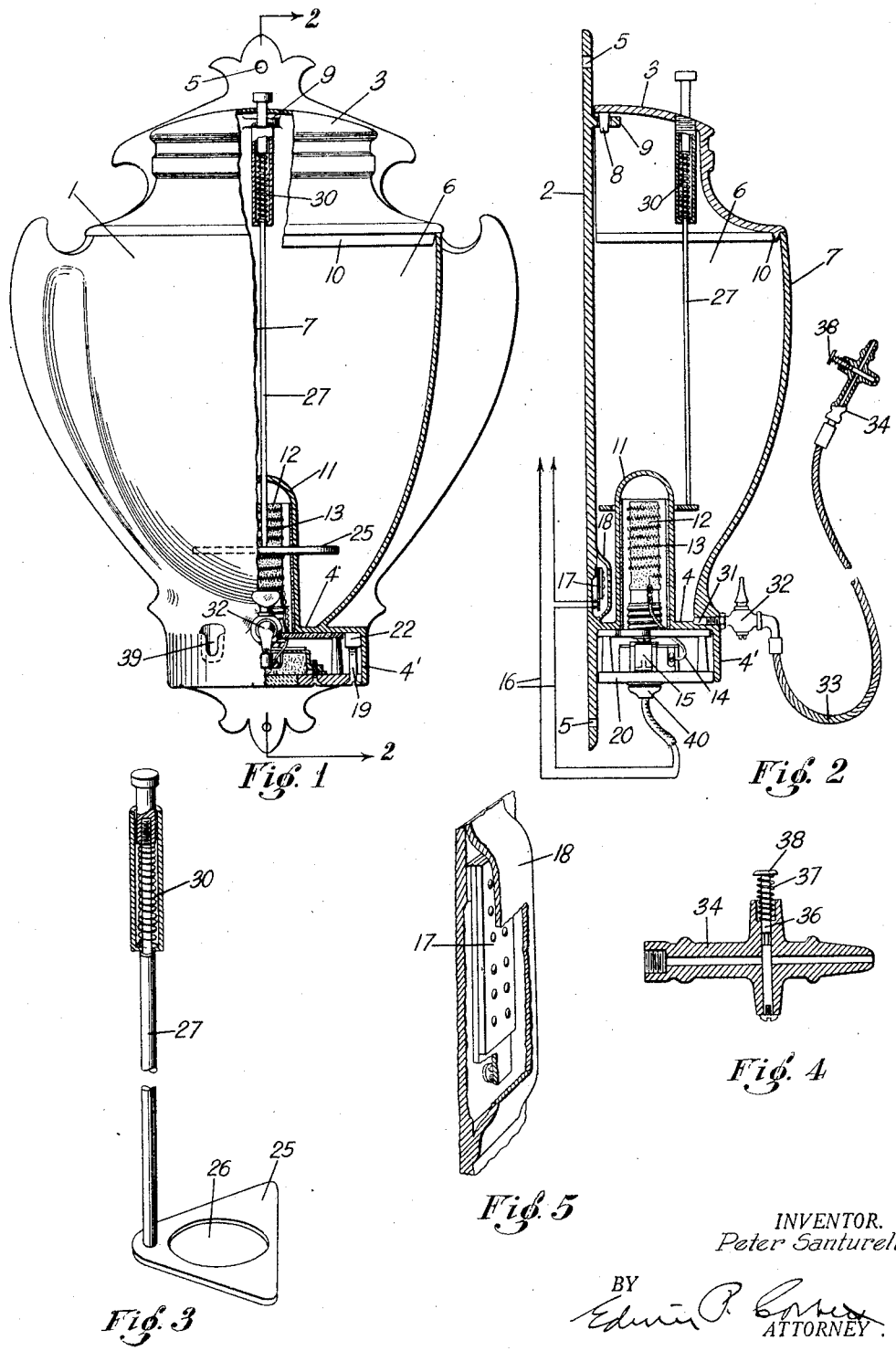
Figure 1 is a front elevation of the preferred embodiment of my invention, with parts broken away to more clearly illustrate some of the elements thereof.
Figure 2 is a section taken on line 2—2 of Figure 1.
Figure 3 is a perspective view of my agitating device removed from the container.
Figure 4 is a sectional view of my dispensing nozzle, shown enlarged.
Figure 5 is an enlarged view of the thermostatic control which I preferably utilize.

With reference to the drawing, especially Figures 1 and 2, I have shown therein the preferred embodiment of my liquid container as comprising a receptacle 1 that is preferably cast in one piece from a suitable metal, such as aluminum or the like. The design of this container is such that it simulates an urn having a wide mouth at the uppermost end and a comparatively restricted lower portion.

More specifically, my invention includes a vertical rear wall 2 that extends well above the uppermost limits of the bowl and somewhat below the base 4 of the fluid compartment. It is provided with apertures 5 by means of which it may be conveniently attached to a wall or post by means of screws. The fluid compartment 6 of this container is formed by means of a front wall 7 that is curved outwardly from the rear wall 2 in the direction of the width of the container. Furthermore, this wall is curved upwardly and outwardly (Figure 2) in the direction of its length from the horizontal base portion 4. It will be noted that the wall 7 is spaced from the rear wall 2 to a greater degree adjacent its uppermost limits than at its lowermost limits, however, it is to be understood that the container may take any desired form or shape.

The receptacle 1 is also provided with a closure member 3 that is also of a fanciful design adapted to harmonize with the remainder of the device. It is shown as preferably comprising a casting, curved in the direction of its width and equipped with a lug 8 on the under side thereof for cooperation with a suitable opening in a flange 9 extending at right angles to the rear plate 2 and formed thereon adjacent the upper end thereof. The bottom of the cap 3 is flanged as at 10 so as to cooperate with the upper edge of the wall 7. It can be seen readily that this cap may be very easily removed for the purpose of refilling the container with liquid soap, oil or the like.

Extending upwardly from the base 4 and into the fluid compartment is a closed tube 11 that is open at its lower end. This tube is cast integrally with the bottom of the receptacle and is adapted to house a resistance unit hereinafter described. It will be understood that this tube may project into the fluid compartment from any of the walls, although I have preferably shown it extending into the fluid compartment at a point where the walls are closest together for a purpose to be hereinafter described.

The resistance unit, hereinbefore mentioned, may be of any type desired, although I preferably utilize one that embodies a tubular porcelain core 12 around which is wound the resistance coil 13, the coil being connected to a wire 14 leading to a switch socket 15. The switch socket and resistance unit are both of standard design and are supported by means of a base member 20 that is upheld by means of screws 19 threaded into the bosses 22 formed on the under side of the base 4. These parts are preferably screened from view by means of an arcuate flange 4' that depends from the base 4.

The resistance unit is connected to a source of electrical energy by means of a circuit 16, the lead wires of the circuit being encased and terminating in the pull plug 40 that is adapted to cooperate with the switch socket 15. However, this circuit is subject to automatic interruption by reason of a thermostat 17 incorporated therein and placed within the container so as to operate in response to changes in temperature of the liquid. This thermostat is preferably so positioned that it will be located below the level of the liquid and is protected by means of a cover 18. It may be of any type desired and it will be understood that it may be so constructed and regulated that it will become inoperative when the temperature of the fluid reaches a desired degree.

I have also provided an agitating means, best shown in Figures 2 and 3, which preferably comprises a triangular-shaped piece of stock 25 that is cut away centrally as at 26 to allow it to be mounted in concentric relation to the cylindrical tube 11 extending into the fluid compartment (Figure 2). This means is made to reciprocate vertically by means of a push rod 27 that extends upwardly through a sleeve carried by the cap, the upper end thereof being provided with a button for conveniently depressing the rod. This rod is returned to initial position by means of the resilient member 30 that is mounted in concentric relation thereto and is located within the sleeve member.

To provide an outlet for the fluid from its compartment, I have provided a conduit 31 formed in the base of the receptacle into which is threaded a stop cock 32. An elongated flexible tube 33 is connected to the nipple of the stop cock and is provided at its opposing end with a nozzle 34. This control valve includes a plunger 36 that is adapted to be depressed manually and so formed as to allow the discharge of fluid when so depressed. It is returnable to closed position by means of a resilient member 37 that engages with a button 38 formed at one end of the plunger. This button also serves the double purpose of affording means by which the tube may be hung up when not in use by readily positioning it in the niche 39 formed in the base flange 4, (Figure 1) of the container.

This device is extremely advantageous for the heating of fluids in that the heating unit extends upwardly into the fluid compartment from the base of the device and at a point where the walls thereof are closest together. This construction ensures that the volume of fluid adjacent the discharge orifice will be heated to the maximum temperature prior to discharge. The contour of the receptacle is such that the fluid is directed toward the heating element.

A further advantageous feature of this invention consists in the fact that the temperature of the fluid is controlled at all times by means of a thermostat. In this manner, the temperature desired may be maintained without danger of overheating the fluid and damaging the container.

Still another advantageous feature of this invention resides in the fact that the agitator is located in that section of the container where it will be most effective to prevent precipitation of the solids that might be held in solution in the fluid. Furthermore, the heating element is also located at the most effective point in that its proximity to the discharge opening ensures that the fluid entering such opening will have a maximum temperature.

Still another advantageous feature of this invention resides in the fact that the flexible discharge tube is provided which enables the operator to dispense the contents of the container at a point or points removed from such receptacle. Furthermore, the discharge tube is provided with a control valve which enables the operator to dispense the fluid in measured amounts.

Having thus described my invention, what I claim is:

1. A container for fluids comprising, in combination, a compartment for the reception of a fluid, a tube extending into said compartment and closed against communication therewith, said tube being located adjacent the base of said container and in the portion of smallest area, a resistance unit located in said tube and adapted to be intermittently rendered effective to heat said tube, a discharge opening in said compartment and located adjacent the lowermost portions thereof and in proximity to said tube and resistance unit, and an elongated tube connected to said discharge opening and having means for controlling the discharge of fluid.

2. A receptacle for containing liquids, which comprises, in combination, a compartment for the reception of a fluid, having a greater cross-section adjacent its top than adjacent its bottom limit, a tube extending upward from the bottom of said receptacle and into said compartment, one end of said tube being closed, and agitating means being located within said compartment and adapted to encircle said tube, said agitator being operable from outside of said compartment, a resistance unit located in said tube, a thermostat for controlling said resistance unit, said thermostat being operable in response to temperature changes in said compartment, a discharge opening having a stop cock therein and an elongated tube connected to said stop cock and having means for controlling the discharge of fluid from said tube.

3. In a receptacle for heating fluids, a fluid receiving compartment, a tube having a closed end extending into said compartment, agitating means located within said compartment and encircling said tube, means for moving said agitator in one direction manually and a resilient means for returning said agitator to initial position.

4. A receptacle for containing liquids which comprises, in combination, a compartment for the reception of a fluid, a cap for said compartment, a tube having a closed end, extending into said compartment from the bottom of said receptacle, an agitating means encircling said tube, a push rod connected to said agitating means and being supported at its upper end by said cap, said rod being movable in one direction manually and in the opposing direction by means of a resilient member.

5. A container for fluids comprising a compartment for the reception of a fluid, agitating means in said compartment, a closed tube extending into said compartment, a resistance unit disposed in said tube adapted to be rendered intermittently effective to heat said tube, a discharge opening in said compartment, a dispensing tube connected to said discharge opening, and a valve in said dispensing tube for controlling the discharge of fluid from said dispensing tube.

6. A container for fluids comprising a flat rear wall and a front wall suitably spaced from said rear wall and secured thereto to form a compartment for the reception of a fluid, a closed tube extending into said compartment, a resistance unit disposed in said tube adapted to be rendered intermittently effective to heat said tube, a discharge opening in said compartment, a dispensing tube connected to said discharge opening, and a valve in said dispensing tube for controlling the discharge of fluid from said dispensing tube.

7. A container for fluids comprising a flat rear wall and a front wall suitably spaced from said rear wall and secured thereto to form a compartment for the reception of a fluid, a closed tube extending into said compartment, a resistance unit disposed in said tube adapted to be rendered intermittently effective to heat said tube, a thermostat disposed in said compartment and operatively connected to said unit for rendering said unit operative or inoperative in response to temperature changes in said compartment, a discharge opening in said compartment, a dispensing tube connected to said discharge opening, and a valve in said dispensing tube for controlling the discharge of fluid therefrom.

8. A container for fluids comprising a flat rear wall and a front wall suitably spaced from said rear wall and secured thereto to form a compartment for the reception of a fluid, agitating means in said compartment, a closed tube extending into said compartment, a resistance unit disposed in said tube adapted to be rendered effective to heat said tube, a discharge opening in said compartment, a dispensing tube connected to said discharge opening, and a valve in said dispensing tube for controlling the discharge of fluid therefrom.

In testimony whereof I hereby affix my signature.

PETER SANTURELLO.